United States Patent [19]
Focke

[11] 4,286,712
[45] Sep. 1, 1981

[54] MULTI-LAYERED FOIL CIGARETTE PACK INCLUDING METHOD AND APPARATUS FOR PRODUCING A TEAR LINE IN THE FOIL
[75] Inventor: Heinz Focke, Verden, Fed. Rep. of Germany
[73] Assignee: Focke & Co., Verden, Fed. Rep. of Germany
[21] Appl. No.: 78,268
[22] Filed: Sep. 24, 1979
[30] Foreign Application Priority Data Oct. 11, 1978 [DE] Fed. Rep. of Germany ....... 2844238

[51] Int. Cl.³ .................... B65D 85/10; B65D 65/28; B65D 5/54
[52] U.S. Cl. ............................... 206/264; 229/87 C; 229/48 R; 206/624; 206/633
[58] Field of Search ............... 206/264, 604, 620, 624, 206/625, 628, 629, 630, 631, 632, 633, 271, 274, 627; 229/7 R, 48 R, 87 E

[56] References Cited
U.S. PATENT DOCUMENTS 2,897,087  7/1959  Lawlor .................. 206/627
3,572,579  3/1971  Mueller .................. 206/627
3,952,868  4/1976  Muller et al. ............ 206/274
4,101,051  7/1978  Reil ...................... 229/7 R
4,158,412  6/1979  Wysocki ................. 206/628
4,226,330  10/1980 Butter ................... 206/620

FOREIGN PATENT DOCUMENTS 2536606  2/1977  Fed. Rep. of Germany ........... 206/274
53-137077  4/1978  Japan ...................................... 206/630

Primary Examiner—Herbert F. Ross
Attorney, Agent, or Firm—Sughrue, Mion, Zinn, Macpeak and Seas

[57] ABSTRACT

A multi-layer bonded foil 10 which forms the inner wrapper of a cigarette pack is provided with a tear line 14 to facilitate opening a tear flap 15. The tear line is formed by a fixed lower tool 25 having a raised rib 28 flanked by grooves 29, 30 and a reciprocable upper tool 20 having a pointed edge 21 and movable between guide supports 22, 23. The upper tool is heated and forced into the foil to stretch-weaken its upper polyester layer 11 and central aluminum foil layer 12, and to simultaneously heat soften and deform its lower polyethylene layer 13.

8 Claims, 3 Drawing Figures

MULTI-LAYERED FOIL CIGARETTE PACK INCLUDING METHOD AND APPARATUS FOR PRODUCING A TEAR LINE IN THE FOIL

BACKGROUND OF THE INVENTION

This invention relates to a cigarette pack made of a multi-layered foil with at least one airtight layer, preferably aluminum foil, and at least one exterior layer of thermoplastic, particularly polyethylene, and having a pre-marked tear line in the foil for opening the pack. The invention also concerns a method and apparatus for preprocessing the foil to form the tear line.

The packaging industry has become increasingly interested in multi-layered bonded foil as a packaging material. The layers bonded together to form the foil can be profitably adapted to the technological demands of different applications. With packages designed to maintain the freshness of food and other consumables over a long period of time, bonded foils having at least one aroma or diffusion proof layer, preferably of aluminum, come into consideration. This foil layer can be supplemented by several layers of plastic, paper or similar materials. Should requirements call for the package to be heat sealed on all sides, the foil can be provided with a suitable heat bonding layer on at least one exterior side, e.g. with polyethylene which has a 110° C. melting point.

In general, difficulty arises when bonded foil of the above mentioned type must be torn along a given line. This necessity arises when a totally sealed package must be opened to allow the use of the contents. In the case of cigarette and other tobacco product packs, an advantageous area of application for air tight foils, it is necessary to provide for an easily and reliably formed opening by tearing the foil. With conventional cigarette packs with an inner wrapper of tinfoil this problem does not arise because the wrapper does not need to form an airtight container, and can therefore be made in the form of a removable flap by using tear-off cuts in relation to the rest of the wrapper. Such tear-off cuts, perforations, etc., are, however, not possible with a package made of foil in the above described manner which is expected to hermetically seal the contents, because the desired seal would be thereby obviated.

SUMMARY OF THE INVENTION

This invention deals in general with the problem of handling foils, particularly bonded foils, with undesireable tearing characteristics in such a manner that they may be easily and exactly torn along a predetermined marked tear line, and particularly when used to form packages providing a tear-open flap or similar feature for opening the package to remove the contents.

The solution to the problem as taught in the invention is to provide the foil with tear lines formed by thermal alteration, particularly transformation of at least the layer consisting of thermally sensitive plastic. This thermal change refers primarily to the process of forming an exactly marked tear line through the application of heat and pressure onto a groove or furrow formed in the proper layer.

Another feature of the invention deals with processing the other layers of the foil, particularly the aluminum foil, at the same location. This processing consists of a mechanical alteration by means of localized stretching or pulling of the layers in the plastic area resulting in a localized reduction in thickness, and in the formation of a rill in these layers in the same location as the groove in the thermal plastic layer. Simultaneous application of these measures can assure exact, reliable, and absolutely airtight tear lines in multi-layered foils with otherwise or normally poor tearing ability.

The above mentioned marking is produced according to the invention by using tools on both sides of the foil in the desired area which exert pressure and heat on at least one side, at a temperature above the melting point of the plastic layer. In addition, at least the aluminum foil is mechanically processed by a tool with a sharp-edged blade, so that a rill-shaped ridge is formed.

BRIEF DESCRIPTION OF THE INVENTION

In the drawings:

FIG. 1 shows an enlarged cross-sectional side view of a three layered bonded foil and a device for producing a tear line therein, FIG. 2 shows a perspective view of a section of the foil with a tear line, and FIG. 3 shows a cigarette pack in perspective including a foil with tear lines.

DETAILED DESCRIPTION OF THE PREFERRED EMBODIMENT

Figure 1:
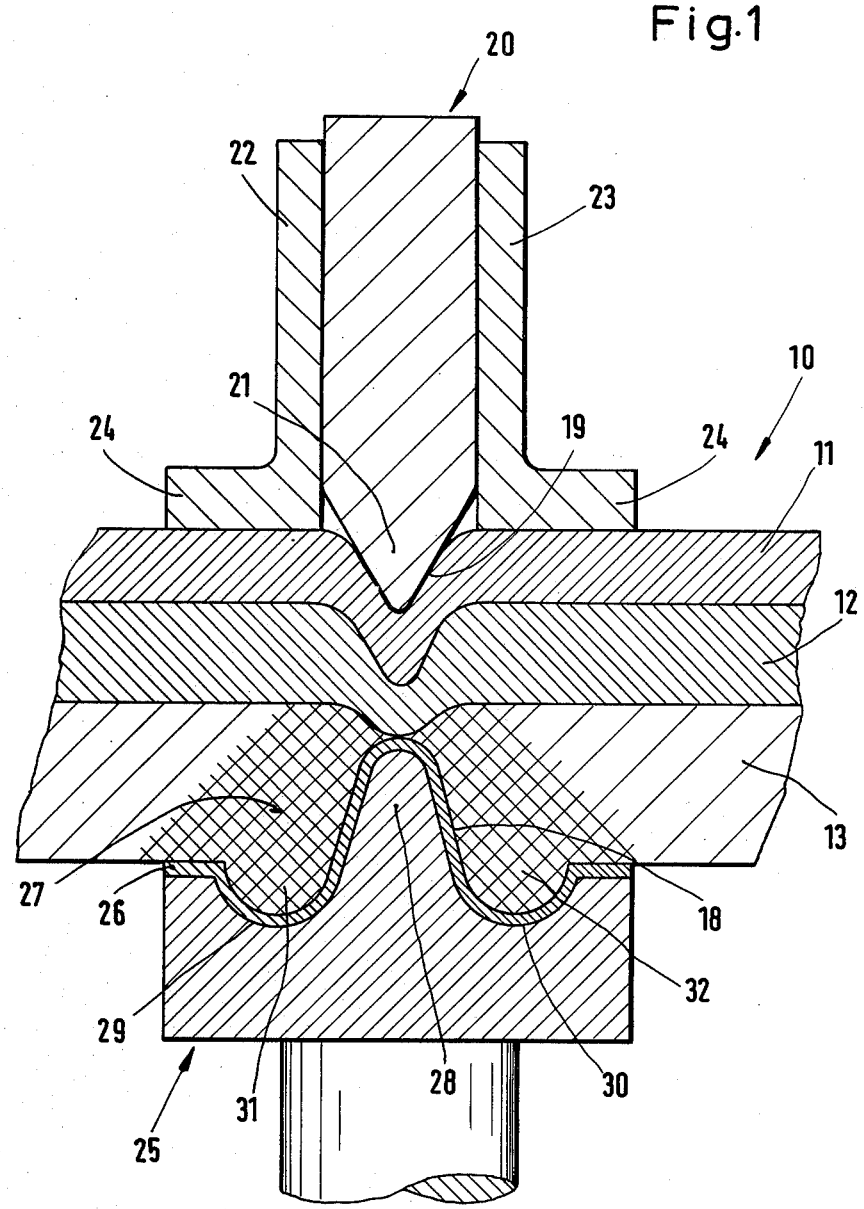

Referring now to the drawings, a bonded foil 10 consists of three layers. The upper layer 11 shown in FIG. 1 is the outer thin layer of polyester, i.e., a plastic layer with a relatively high melting point of approximately 250° C. Then follows a middle or inner layer 12 such as an aluminum foil 12, which serves as an aroma barrier. This is covered on the bottom by a layer of thermoplastic 13, such as polyethylene. The layers in this case are formed with varying thicknesses. The polyester layer 11 can have a thickness of 12μ, the aluminum foil 12 is about the same thickness, while the polyethylene layer 13 has greater strength and thickness, e.g. between 20 and 75μ.

Figure 2:
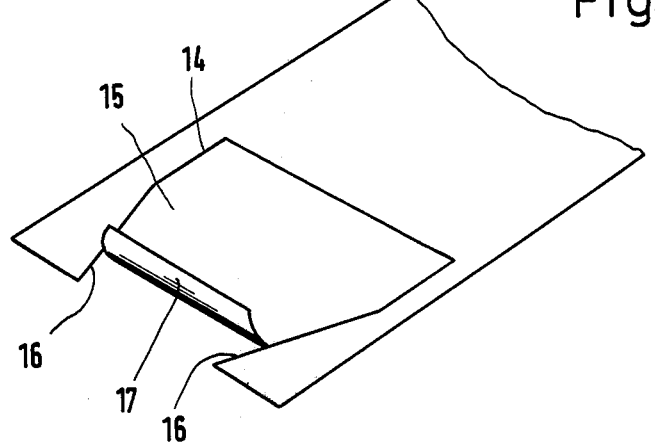

This bonded foil is provided with a tear line 14 which makes it possible to tear the foil along a predetermined line. As shown in FIG. 2, such a tear line 14 can be used to form an opening flap 15 for the pack. This flap extends from a free or cut edge of the bonded foil 10, and has short starting cuts 16 on both sides of the flap. These starting cuts form a loose grip flap 17, which is used to grasp when tearing and opening flap 15 away from the rest of the bonded foil 10 along the tear lines 14.

The tear line 14 is formed by processing the bonded foil 10 with pressure and heat. The temperature applied to the bonded foil in the area of the tear line is set high enough to cause a transformation in the thermally sensitive layer, in this case the polyethylene layer 13. This is locally melted and transformed into a groove 18 which extends to the bottom of the foil 12. This foil layer is also processed in the area of the tear line 14; it is stretched or pulled in the area of the molten transformation. The aluminum foil 12 thereby experiences a reduction in thickness, as does the polyester layer 11, and forms an essentially V-shaped rill 19. This rill 19, the localized reduction in thickness, and the groove 18 form the continuous airtight tear line 14.

The bonded foil 10 is stamped with tools which engage the foil on both sides. A movable stamper 20 contacts from above. A short or tapered pressure edge 21 of the stamper 20 contacts the bonded foil and produces the transformation in the polyester layer 11 as well as in the aluminum foil layer 12.

Rigid supports 22, 23 are located on both sides of the stamper 20, whose guide legs 24 engage the surface of the bonded foil 10 on both sides of the rill 19. Unwanted deformation is thus avoided in this area. In addition, the holding force of the guide legs 24 makes it possible to stretch the aluminum foil 12 and the polyester layer 11 through relative movement of the stamper 20. The stamper is heated to approximately 150° C.

The opposite tool is an opposing receptacle 25 which contacts the polyethylene layer 13. To prevent the plasticized polyethylene from adhering to the surface of this opposing receptacle, it is coated with a layer 26 of Teflon, polyester or the like.

The heat applied by the stamper 20 is transferred into the polyethylene layer 13 which has a relatively low melting point. This occurs without appreciable heat loss or deleterious effects on the polyester layer 11 or the aluminum foil 12, and produces a melting or plasticized zone 27 in the polyethylene layer 13 which is deformed by the opposing pressure of the receptacle 25. The receptacle is provided with a rib-shaped protuberance 28 opposite the stamper 20 which forms the groove 18 in the polyethylene layer. Groove-shaped indentations 29 and 30 flank the protuberance 28. The indentations accomodate the extra material squeezed out from the polyethylene layer 13 and form it into convoluted beads 31, 32 on both sides of the groove 18. These form an additional demarcation for the tear line 14 and thereby add stability to the tearing process. The receptacle 25 can also be heated if necessary. The linear shape of the stamping tool device would, of course, correspond to at least the shape or pattern of the desired tear line 14.

Alternatively, continuous working rollers and opposing rollers on both sides of the bonded foil 10 can be substituted for the stroking apparatus to produce the tear line.

Figure 3:
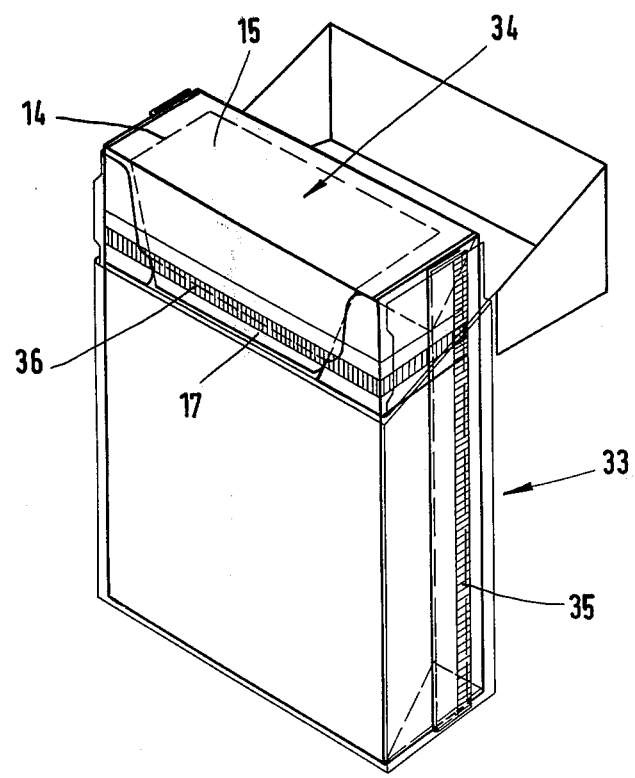

The bonded foil 10 described here can be used to great advantage as a hermetically sealing inner wrapper for cigarette packs. FIG. 3 shows a "flip top" type of pack. A number of cigarettes are packed inside a flip top box with an inner wrapper 34, closed on all sides and made of bonded foil 10. This inner wrapper is constructed so that the bonded foil 10, with its polyethylene layer 13 on the inside, has a vertical "finned seam" 35 on the sides. A transverse tube seam 36 helps form a grip flap 17 for the tear-open flap 15. The latter is marked onto the inner wrapper 34 in the front and upper parts thereof by a tear line 14 produced in the manner described above. The overall construction of the cigarette pack per se, which forms no part of the present invention, is disclosed in German patent application Ser. No. P 28 33 389.3.

I claim:

1. A cigarette pack made of a multi-layered, composite bonded foil having a moisture and aroma proof layer of metal foil, and an exterior layer of a thermoplastic material, particularly polyethylene, and having a pre-marked tear line on the foil defining a removable flap for opening the pack, characterized by: the tear line (14) having a reduced thickness formed by the thermal deformation of at least the thermoplastic layer (13) and a reduced thickness of said metal foil.

2. A pack according to claim 1, wherein the thermoplastic layer is provided with a groove (18) formed by heat and pressure in the area of the tear line.

3. A pack according to claim 2, wherein the metal foil (12) is mechanically stretched in the area of the tear line.

4. A pack according to claim 3, wherein the metal foil is an aluminum foil and is provided with an impressed rill (19) opposite the groove.

5. A pack according to claim 4, wherein the tear line (14) has starting cuts (16) to facilitate the beginning of the tear.

6. A pack according to claim 3, wherein the groove is flanked by protruding thickened areas (31, 32) on both sides formed by the deformation of the thermoplastic material during the formation of the groove.

7. A pack according to claim 6 wherein the groove extends inwardly to the metal foil.

8. A pack according to claim 7, wherein the groove has a V-shaped cross-section.

* * * * *